United States Patent
Galbo et al.

(10) Patent No.: US 8,429,391 B2
(45) Date of Patent: Apr. 23, 2013

(54) BOOT PARTITIONS IN MEMORY DEVICES AND SYSTEMS

(75) Inventors: Neal A. Galbo, Boca Raton, FL (US); Victor Y. Tsai, Palo Alto, CA (US); William H. Radke, Los Gatos, CA (US); Krishnam R. Datla, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 426 days.

(21) Appl. No.: 12/762,049

(22) Filed: Apr. 16, 2010

(65) Prior Publication Data

US 2011/0258425 A1    Oct. 20, 2011

(51) Int. Cl.
*G06F 9/00* (2006.01)
*G06F 9/24* (2006.01)
*G06F 13/00* (2006.01)

(52) U.S. Cl.
USPC .................................. 713/2; 713/1; 711/173

(58) Field of Classification Search .................. 713/1, 2
See application file for complete search history.

(56) References Cited

U.S. PATENT DOCUMENTS

| | | |
|---|---|---|
| 5,450,576 A | 9/1995 | Kennedy |
| 5,555,540 A | 9/1996 | Radke |
| 5,659,748 A | 8/1997 | Kennedy |
| 5,751,699 A | 5/1998 | Radke |
| 5,835,784 A | 11/1998 | Gillespie et al. |
| 6,295,575 B1 * | 9/2001 | Blumenau et al. ............... 711/5 |
| 6,301,657 B1 | 10/2001 | Jones et al. |
| 6,370,645 B1 | 4/2002 | Lee |
| 6,430,687 B1 | 8/2002 | Aguilar et al. |
| 6,484,229 B1 * | 11/2002 | Ichikawa et al. .................. 711/4 |
| 6,484,245 B1 * | 11/2002 | Sanada et al. .................. 711/164 |
| 6,646,646 B2 | 11/2003 | Peterson et al. |
| 6,715,031 B2 * | 3/2004 | Camble et al. ................. 711/111 |
| 6,734,865 B1 | 5/2004 | Peterson et al. |
| 6,741,253 B2 | 5/2004 | Radke et al. |
| 6,766,351 B1 | 7/2004 | Datla |
| 6,784,889 B1 | 8/2004 | Radke |
| 6,791,555 B1 | 9/2004 | Radke et al. |
| 6,816,165 B1 | 11/2004 | Radke |
| 6,816,750 B1 | 11/2004 | Klaas |
| 6,856,529 B1 | 2/2005 | Radke |
| 6,956,577 B2 | 10/2005 | Radke et al. |
| 6,963,343 B1 | 11/2005 | Peterson et al. |
| 7,006,377 B2 | 2/2006 | Oh |
| 7,024,551 B2 | 4/2006 | King et al. |
| 7,032,106 B2 | 4/2006 | Horanzy et al. |
| 7,073,013 B2 | 7/2006 | Lasser |
| 7,139,182 B2 | 11/2006 | Radke |

(Continued)

OTHER PUBLICATIONS

International Search Report and Written Opinion for related PCT Patent Application No. PCT/US2011/000651 dated Nov. 30, 2011 (9 pp.).

*Primary Examiner* — Suresh Suryawanshi
(74) *Attorney, Agent, or Firm* — Brooks, Cameron & Huebsch, PLLC

(57) ABSTRACT

The present disclosure includes boot partitions in memory devices and systems, and methods associated therewith. One or more embodiments include an array of memory cells, wherein the array includes a boot partition and a number of additional partitions. Sequential logical unit identifiers are associated with the additional partitions, and a logical unit identifier that is not in sequence with the sequential logical unit identifiers is associated with the boot partition.

35 Claims, 3 Drawing Sheets

U.S. PATENT DOCUMENTS

| | | |
|---|---|---|
| 7,180,522 B2 | 2/2007 | Radke et al. |
| 7,206,832 B2 * | 4/2007 | Matsunami et al. .......... 709/223 |
| 7,222,230 B2 | 5/2007 | Hsu |
| 7,231,643 B1 | 6/2007 | Galbo et al. |
| 7,234,052 B2 | 6/2007 | Lee et al. |
| 7,237,105 B2 | 6/2007 | Fujita et al. |
| 7,284,084 B2 | 10/2007 | Atherton et al. |
| 7,296,143 B2 | 11/2007 | Gaskins et al. |
| 7,322,002 B2 | 1/2008 | Keays et al. |
| 7,369,434 B2 | 5/2008 | Radke |
| 7,379,068 B2 | 5/2008 | Radke |
| 7,389,465 B2 | 6/2008 | Radke et al. |
| 7,397,477 B2 | 7/2008 | Radke |
| 7,409,672 B1 | 8/2008 | Datla |
| 7,444,543 B2 | 10/2008 | Babudri et al. |
| 7,444,579 B2 | 10/2008 | Radke et al. |
| 7,453,723 B2 | 11/2008 | Radke |
| 7,467,417 B2 | 12/2008 | Stillerman et al. |
| 7,493,484 B2 | 2/2009 | Lee |
| 7,496,719 B2 | 2/2009 | Peterson et al. |
| 7,499,902 B2 | 3/2009 | Datla et al. |
| 7,512,909 B2 | 3/2009 | Radke |
| 7,594,063 B1 | 9/2009 | Estakhri et al. |
| 8,082,435 B2 * | 12/2011 | Ugokwe .......................... 713/2 |
| 2002/0070941 A1 | 6/2002 | Peterson et al. |
| 2003/0067472 A1 | 4/2003 | Radke et al. |
| 2003/0233533 A1 | 12/2003 | Avraham |
| 2004/0183808 A1 | 9/2004 | Radke et al. |
| 2005/0024367 A1 | 2/2005 | Radke |
| 2005/0030313 A1 | 2/2005 | Radke et al. |
| 2005/0052889 A1 | 3/2005 | Radke |
| 2005/0128208 A1 | 6/2005 | Radke |
| 2005/0152288 A1 | 7/2005 | Datla et al. |
| 2005/0169030 A1 | 8/2005 | Radke |
| 2005/0172207 A1 | 8/2005 | Radke et al. |
| 2005/0195738 A1 | 9/2005 | Datla et al. |
| 2005/0268077 A1 | 12/2005 | Kuan et al. |
| 2005/0268203 A1 | 12/2005 | Keays et al. |
| 2005/0273851 A1 | 12/2005 | Raju Datla et al. |
| 2006/0004742 A1 | 1/2006 | Datla et al. |
| 2006/0007944 A1 | 1/2006 | Movassaghi et al. |
| 2006/0010282 A1 | 1/2006 | Kim |
| 2006/0012393 A1 | 1/2006 | Raju Datla et al. |
| 2006/0013217 A1 | 1/2006 | Datla et al. |
| 2006/0015591 A1 | 1/2006 | Datla et al. |
| 2006/0064575 A1 | 3/2006 | Jo |
| 2006/0075395 A1 | 4/2006 | Lee et al. |
| 2006/0143368 A1 | 6/2006 | Lasser et al. |
| 2006/0161725 A1 * | 7/2006 | Lee et al. ...................... 711/103 |
| 2006/0179302 A1 | 8/2006 | Hatakeyama |
| 2006/0203529 A1 | 9/2006 | Radke |
| 2006/0245274 A1 | 11/2006 | Choi et al. |
| 2006/0248434 A1 | 11/2006 | Radke et al. |
| 2007/0028083 A1 | 2/2007 | Yu et al. |
| 2007/0028084 A1 | 2/2007 | Yu et al. |
| 2007/0113067 A1 | 5/2007 | Oh et al. |
| 2007/0162824 A1 | 7/2007 | Radke et al. |
| 2007/0180223 A1 | 8/2007 | Tanaka |
| 2007/0180291 A1 | 8/2007 | Galbo et al. |
| 2007/0192529 A1 | 8/2007 | Roh et al. |
| 2007/0206434 A1 | 9/2007 | Radke |
| 2007/0220247 A1 | 9/2007 | Lee et al. |
| 2007/0226592 A1 | 9/2007 | Radke |
| 2007/0233955 A1 | 10/2007 | Luo et al. |
| 2007/0250693 A1 | 10/2007 | Lin et al. |
| 2007/0253384 A1 | 11/2007 | Kanagala et al. |
| 2007/0254710 A1 | 11/2007 | Kanagala et al. |
| 2007/0260869 A1 | 11/2007 | Dade et al. |
| 2007/0283140 A1 | 12/2007 | Jones et al. |
| 2008/0037320 A1 | 2/2008 | Radke |
| 2008/0040596 A1 | 2/2008 | Mai et al. |
| 2008/0040598 A1 | 2/2008 | Lee et al. |
| 2008/0046711 A1 | 2/2008 | Tung et al. |
| 2008/0056027 A1 | 3/2008 | Radke |
| 2008/0072120 A1 | 3/2008 | Radke |
| 2008/0082814 A1 | 4/2008 | Kuo et al. |
| 2008/0086631 A1 | 4/2008 | Chow et al. |
| 2008/0092017 A1 | 4/2008 | Keays et al. |
| 2008/0098164 A1 | 4/2008 | Lee et al. |
| 2008/0147964 A1 * | 6/2008 | Chow et al. ................... 711/103 |
| 2008/0155130 A1 | 6/2008 | Mosek |
| 2008/0172554 A1 | 7/2008 | Armstrong et al. |
| 2008/0184094 A1 | 7/2008 | Murray et al. |
| 2008/0215870 A1 | 9/2008 | Liew |
| 2008/0215930 A1 | 9/2008 | Radke |
| 2008/0218525 A1 | 9/2008 | Radke |
| 2008/0266306 A1 | 10/2008 | Radke |
| 2009/0013233 A1 | 1/2009 | Radke |
| 2009/0013234 A1 | 1/2009 | Radke |
| 2009/0019321 A1 | 1/2009 | Radke |
| 2009/0019340 A1 | 1/2009 | Radke et al. |
| 2009/0055639 A1 | 2/2009 | Kuusilinna et al. |
| 2009/0055697 A1 | 2/2009 | Radke et al. |
| 2009/0067249 A1 | 3/2009 | Radke |
| 2009/0089534 A1 * | 4/2009 | Zohar et al. ................... 711/173 |
| 2009/0103362 A1 | 4/2009 | Pekny et al. |
| 2009/0103380 A1 | 4/2009 | Pekny et al. |
| 2009/0109747 A1 | 4/2009 | Radke |
| 2009/0122989 A1 | 5/2009 | Asnaashari et al. |
| 2009/0129169 A1 | 5/2009 | Roohparvar et al. |
| 2009/0132755 A1 | 5/2009 | Radke |
| 2009/0132889 A1 | 5/2009 | Radke |
| 2009/0172321 A1 | 7/2009 | Scheuerlein et al. |
| 2009/0198880 A1 | 8/2009 | Radke |
| 2009/0248952 A1 | 10/2009 | Radke et al. |
| 2009/0271214 A1 | 10/2009 | Kandasamy et al. |
| 2009/0271351 A1 | 10/2009 | Kandasamy et al. |
| 2009/0276545 A1 | 11/2009 | Lee et al. |
| 2009/0300269 A1 | 12/2009 | Radke et al. |
| 2009/0327595 A1 | 12/2009 | Estakhri et al. |

* cited by examiner

BOOT PARTITIONS IN MEMORY DEVICES AND SYSTEMS

TECHNICAL FIELD

The present disclosure relates generally to semiconductor memory devices, methods, and systems, and more particularly, to boot partitions in memory devices and systems

BACKGROUND

Memory devices are typically provided as internal, semiconductor, integrated circuits and/or external removable devices in computers and other electronic devices. There are many different types of memory including random-access memory (RAM), read only memory (ROM), dynamic random access memory (DRAM), synchronous dynamic random access memory (SDRAM), phase change random access memory (PCRAM), and flash memory, among others.

Flash memory devices can be utilized as volatile and non-volatile memory for a wide range of electronic applications. Flash memory devices typically use a one-transistor memory cell that allows for high memory densities, high reliability, and low power consumption. Uses for flash memory include memory for solid state drives (SSDs), personal computers, personal digital assistants (PDAs), digital cameras, cellular telephones, portable music players, e.g., MP3 players, and movie players, among other electronic devices. Data, such as program code, user data, and/or system data, such as a basic input/output system (BIOS), are typically stored in flash memory devices.

Two common types of flash memory array architectures are the "NAND" and "NOR" architectures, so called for the logical form in which the basic memory cell configuration of each is arranged. A NAND array architecture arranges its array of memory cells in a matrix such that the control gates of each memory cell in a "row" of the array are coupled to (and in some cases form) an access line, which is commonly referred to in the art as a "word line". However each memory cell is not directly coupled to a data line (which is commonly referred to as a digit line, e.g., a bit line, in the art) by its drain. Instead, the memory cells of the array are coupled together in series, source to drain, between a common source and a data line, where the memory cells commonly coupled to a particular data line are referred to as a "column".

Memory cells in a NAND array architecture can be programmed to a desired state. For example, electric charge can be placed on or removed from a charge storage node of a memory cell to put the cell into one of a number of programmed states. For example, a single level cell (SLC) can represent two states, e.g., 1 or 0. Flash memory cells can also store more than two states, e.g., 1111, 0111, 0011, 1011, 1001, 0001, 0101, 1101, 1100, 0100, 0000, 1000, 1010, 0010, 0110, and 1110. Such cells can be referred to as multilevel cells (MLCs). MLCs can allow the manufacture of higher density memories without increasing the number of memory cells since each cell can represent more than one digit, e.g., more than one bit. For example, a cell capable of representing four digits can have sixteen programmed states.

A memory system can include a host, such as a computer, and various types of memory used in various combinations to provide memory for the host. For example, a memory system can include a host and an external memory device coupled to the host. The external memory device can be, for example, a flash memory device. Additionally, the external memory device can be a removable memory device coupled to the host through an interface, such as a USB connection, for example.

The external memory device can include, e.g., store, system boot code used to boot the memory system. For example, responsive to a booting event of the memory system, the boot code, e.g., data representing the boot code, can be loaded from the external memory device to the host, and the host can use the boot code to boot the memory system. However, the boot code stored in the memory device may be visible to a user of the host.

DETAILED DESCRIPTION

Figure 1:
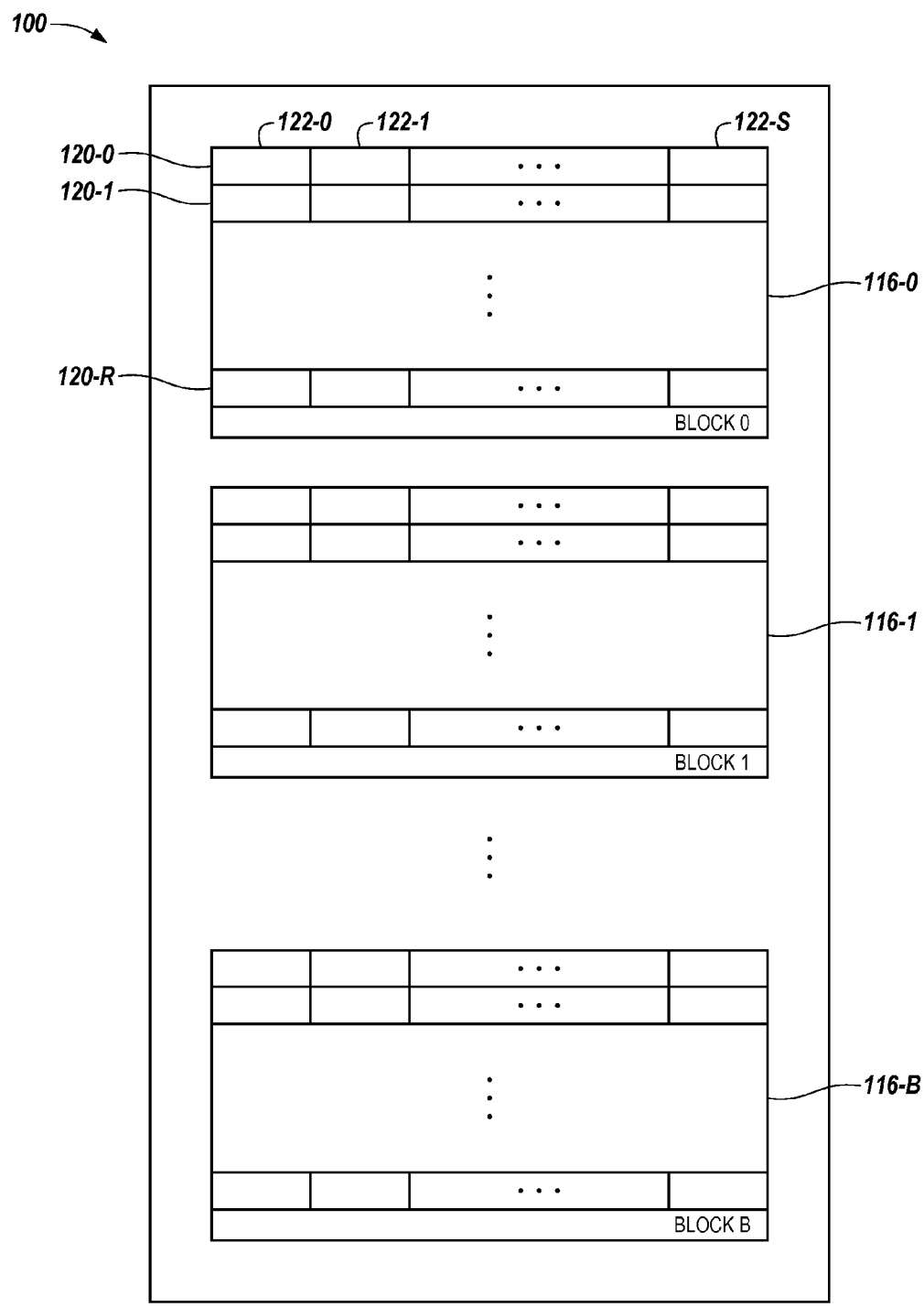
FIG. 1 illustrates a diagram of a portion of a memory array having a number of physical blocks in accordance with one or more embodiments of the present disclosure.

The present disclosure includes boot partitions in memory devices and systems, and methods associated therewith. One or more embodiments include an array of memory cells, wherein the array includes a boot partition and a number of additional partitions. Sequential logical unit identifiers are associated with the additional partitions, and a logical unit identifier that is not in sequence with the sequential logical unit identifiers is associated with the boot partition.

Embodiments of the present disclosure can prevent a user from viewing a boot partition, e.g., boot code, included, e.g., stored, in a memory device. For example, the boot partition in the memory device may not be visible to a user of a host coupled to the memory device. That is, the boot partition may be hidden from the user.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, "a number of" something can refer to one or more such things. For example, a number of memory devices can refer to one or more memory devices. Additionally, the designators "B", "P", "R", and "S" as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 232 may reference element "32" in FIG. 2, and a similar element may be referenced as 332 in FIG. 3. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

FIG. 1 illustrates a diagram of a portion of a memory array 100 having a number of physical blocks in accordance with one or more embodiments of the present disclosure. Memory array 100 can be, for example, a NAND or NOR flash non-volatile memory array. However, embodiments of the present disclosure are not limited to a particular type of memory array. Further, although not shown in FIG. 1, one of ordinary skill in the art will appreciate that memory array 100 can be located on a particular semiconductor die along with various peripheral circuitry associated with the operation thereof.

As shown in FIG. 1, memory array 100 has a number of physical blocks 116-0 (BLOCK 0), 116-1 (BLOCK 1), ..., 116-B (BLOCK B) of memory cells. The memory cells can be single level cells and/or multilevel cells. As an example, the number of physical blocks in memory array 100 may be 128 blocks, 512 blocks, or 1,024 blocks, but embodiments are not limited to a particular multiple of 128 or to any particular number of physical blocks in memory array 100.

In the example shown in FIG. 1, each physical block 116-0, 116-1, ..., 116-B includes memory cells which can be erased together as a unit, e.g., the cells in each physical block can be erased in a substantially simultaneous manner. For instance, the memory cells in each physical block can be erased together in a single erase operation.

As shown in FIG. 1, each physical block 116-0, 116-1, ..., 116-B contains a number of physical rows, e.g., 120-0, 120-1, ..., 120-R, of memory cells coupled to access lines, e.g., a word lines. The number of rows, e.g., word lines, in each physical block can be 32, but embodiments are not limited to a particular number of rows 120-0, 120-1, ..., 120-R per physical block.

As one of ordinary skill in the art will appreciate, each row 120-0, 120-1, ..., 120-R can include, e.g., store, one or more physical pages of data. A physical page refers to a unit of programming and/or sensing, e.g., a number of cells that are programmed and/or sensed together as a functional group of memory cells. In the embodiment shown in FIG. 1, each row 120-0, 120-1, ..., 120-R stores one page of data. However, embodiments of the present disclosure are not so limited. For instance, in one or more embodiments of the present disclosure, each row can store multiple pages of data, with one or more even pages of data associated with even-numbered bit lines, and one or more odd pages of data associated with odd numbered bit lines. Additionally, for embodiments including multilevel cells, a physical page can be logically divided into an upper page and a lower page of data, with each cell in a row contributing one or more bits towards an upper page of data and one or more bits towards a lower page of data. In one or more embodiments, a memory array can include multiple physical blocks of memory cells and each physical block can be organized into multiple pages.

In one or more embodiments of the present disclosure, and as shown in FIG. 1, a page associated with a row can store data, e.g., after a programming operation, in accordance with a number of physical sectors 122-0, 122-1, ..., 122-S. Each physical sector 122-0, 122-1, ..., 122-S can store data that corresponds to one or more logical sectors of data. For example, a particular physical sector, e.g., data stored in the particular physical sector, can correspond to a particular logical sector. Additionally, a portion of data stored in one or more physical sectors can correspond to a particular logical sector. For example, a first portion of data stored in a particular physical sector can correspond to a first logical sector, and a second portion of data stored in the particular physical sector can correspond to a second logical sector. Each physical sector 122-0, 122-1, ..., 122-S, can also store system and/or user data, and can include overhead information, such as error correction code (ECC) information and logical block address (LBA) information.

As one of ordinary skill in the art will appreciate, logical block addressing is a scheme that can be used by a host for identifying a logical sector of data. For example, each logical sector can correspond to a unique logical block address (LBA). Additionally, an LBA may also correspond to a physical address. As an example, a logical sector of data can be a number of bytes of data, e.g., 256 bytes, 512 bytes, or 1,024 bytes. However, embodiments are not limited to these examples.

In one or more embodiments of the present disclosure, a number of LBAs can correspond to a logical unit. That is, a logical unit can include a number of LBAs, e.g., a number of logical sectors of data. Additionally, in one or more embodiments, a logical unit can be associated with one or more logical partitions. For example, a particular logical unit can correspond to a particular logical partition. Additionally, a logical unit can be a subdivision of a logical partition, e.g., a logical partition can include two or more logical units. Alternatively, a logical partition can be a subdivision of a logical unit, e.g., a logical unit can include two or more logical partitions.

It is noted that other configurations for the physical blocks 116-0, 116-1, ..., 116-B, rows 120-0, 120-1, ..., 120-R, sectors 122-0, 122-1, ..., 122-S, and pages are possible. For example, rows 120-0, 120-1, ..., 120-R of physical blocks 116-0, 116-1, ..., 116-B can each store data corresponding to a single logical sector which can include, for example, more or less than 512 bytes of data.

Figure 2:
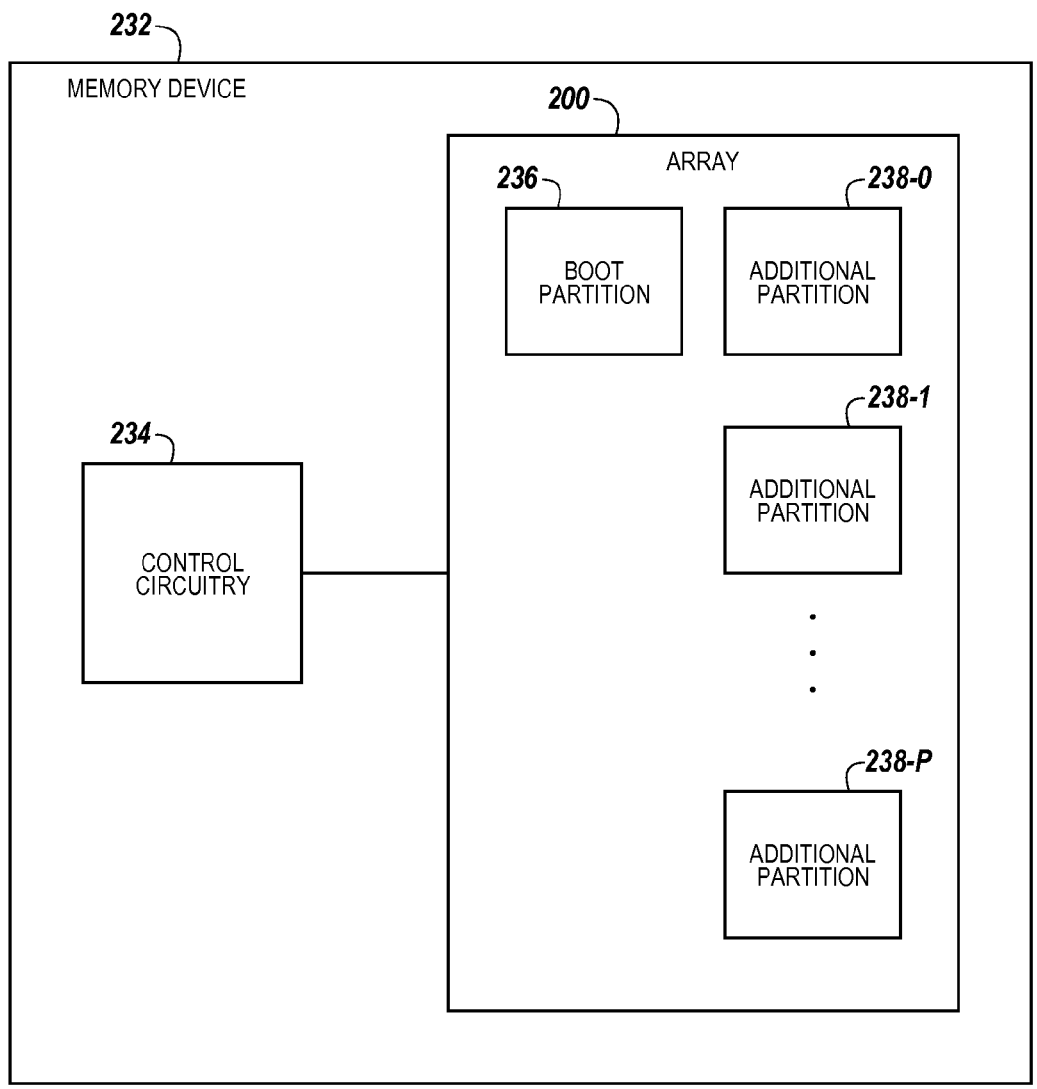
FIG. 2 illustrates a block diagram of a memory device in accordance with one or more embodiments of the present disclosure.

FIG. 2 illustrates a block diagram of a memory device 232 in accordance with one or more embodiments of the present disclosure. Memory device 232 can be, for example, a flash memory device, such as a universal flash storage (UFS) device. However, embodiments of the present disclosure are not limited to a particular type of memory device.

As shown in FIG. 2, memory device 232 includes a memory array 200. Memory array 200 can be analogous to, for example, memory array 100 previously described in connection with FIG. 1. Although one memory array is shown in FIG. 2, embodiments of the present disclosure are not so limited, e.g., memory device 232 can include more than one memory array.

As shown in FIG. 2, memory array 200 includes a boot partition 236 and a number of additional partitions 238-0, 238-1, ..., 238-P. The number of additional partitions can be, for example, eight or sixteen. However, embodiments of the present disclosure are not limited to a particular number of additional partitions. Additionally, although memory array 200 is shown in FIG. 2 as including one boot partition, embodiments of the present disclosure are not so limited, e.g., memory array 200 can include more than one boot partition.

Boot partition 236 and/or additional partitions 238-0, 238-1, ... 238-P can be physical partitions, e.g., one or more physical blocks, rows, pages, or sectors, as previously described herein. Boot partition 236 and/or additional partitions 238-0, 238-1, ..., 238-P can also be logical partitions. For example, boot partition 236 and/or additional partitions 238-0, 238-1, ..., 238-P can each correspond to a particular logical unit, boot partition 236 and/or additional partitions 238-0, 238-1, ..., 238-P can be subdivisions of logical units, and/or logical units can be subdivisions of boot partition 236 and/or additional partitions 238-0, 238-1, ..., 238-P, as previously described herein.

A boot partition, as used herein, can be a physical or logical partition in a memory array that includes boot code for a memory system that is executable by a host in the memory system. For example, boot partition 236 can include boot code for a memory system, such as memory system 350 described in connection with FIG. 3, that is executable by a host, such as host 352 described in connection with FIG. 3, in the memory system. The boot code can be used, e.g., executed, by the host to boot the memory system during a booting operation, e.g., a booting operation of the memory system, as will be further described herein.

In embodiments in which memory array 200 includes more than one boot partition, the boot partitions can include different boot code for the memory system. For example, a first partition can include a first version of boot code, a second partition can include a second version of boot code that is different than the first version, a third partition can include a third version of boot code that is different than the first and second versions, etc. Additionally, the boot partitions can include identical boot code for the memory system. For example, one of the boot partitions can include particular boot code, and the other boot partitions can include duplicate copies of the particular boot code, e.g., for redundancy.

Additional partitions 238-0, 238-1, . . . , 238-P can be non-boot partitions, e.g., partitions that do not include boot code and/or are not used during a booting operation. Rather, additional partitions 238-0, 238-1, . . . , 238-P can be partitions that are used during programming, sensing, and/or erase operations performed on memory device 232. That is, additional partitions 238-0, 238-1, . . . 238-P can store data associated with programming, sensing, and/or erase operations performed on memory device 232.

As shown in FIG. 2, memory device 232 also includes control circuitry 234 coupled to memory array 200. Control circuitry 234 can be configured to associate logical unit identifiers with boot partition 236 and additional partitions 238-0, 238-1, . . . , 238-P. The logical unit identifiers can be, for example, logical unit numbers (LUNs). However, embodiments of the present disclosure are not limited to a particular type of logical unit identifier.

For example, control circuitry 234 can be configured to assign, in a configuration descriptor list, a unique logical unit identifier, e.g., a unique logical unit number (LUN), to boot partition 236 and a unique logical unit identifier, e.g., a unique LUN, to each additional partition 238-0, 238-1, . . . , 238-P. The LUNs can be associated with, e.g., assigned to, boot partition 236 and additional partitions 238-0, 238-1, . . . , 238-P during manufacture and/or operation of memory device 232.

The LUN associated with boot partition 236 can be a default LUN that has been pre-assigned to boot partition 236. That is, a particular LUN can be pre-assigned as the default LUN to be associated with, e.g., assigned to, boot partition 236, and control circuitry 234 can be configured to assign the particular LUN to boot partition 236.

The LUNs associated with additional partitions 238-0, 238-1, . . . 238-P can be sequential LUNs and/or can be within a range of LUNs. The LUN associated with boot partition 236 may not be in sequence with the sequential LUNs associated with additional partitions 238-0, 238-1, . . . , 238-P. Additionally, the LUN associated with boot partition 236 can be outside the range of LUNs associated with additional partitions 238-0, 238-1, . . . , 238-P. Further, the LUN associated with boot partition 236 can be larger than each of the LUNs associated with additional partitions 238-0, 238-1, . . . , 238-P. For example, the sequence and/or range of LUNs associated with additional partitions 238-0, 238-1, . . . , 238-P can include all integers from 0 to N−1, inclusive, wherein N is equal to the number of additional partitions 238-0, 238-1, . . . , 238-P, and the LUN associated with boot partition 236 may be outside this sequence and/or range, e.g., the LUN associated with boot partition 236 can be larger than N. For instance, if the number of additional partitions is eight, the sequence and/or range of LUNs associated with the additional partitions can be LUN [0], LUN [1], . . . , LUN [7], and the LUN associated with the boot partition can be LUN [X], wherein X is outside this sequence and/or range, e.g., LUN [99].

Associating a LUN with boot partition 236 that is not in sequence with and/or outside the range of the LUNs associated with additional partitions 238-0, 238-1, . . . , 238-P in accordance with one or more embodiments of the present disclosure can prevent a user from viewing a boot partition 236, e.g., the boot code associated with boot partition 236. For example, boot partition 236 may not be visible to a user of a host, such as host 352 described in connection with FIG. 3, coupled to memory device 232. That is, boot partition 236 may be hidden from the user.

The embodiment illustrated in FIG. 2 can include additional circuitry that is not illustrated so as not to obscure embodiments of the present disclosure. For example, memory device 232 can include address circuitry to latch address signals provided over I/O connectors through I/O circuitry. Address signals can be received and decoded by a row decoder and a column decoder, to access memory array 200. It will be appreciated by those skilled in the art that the number of address input connectors can depend on the density and architecture of memory device 232 and/or memory array 200.

Figure 3:
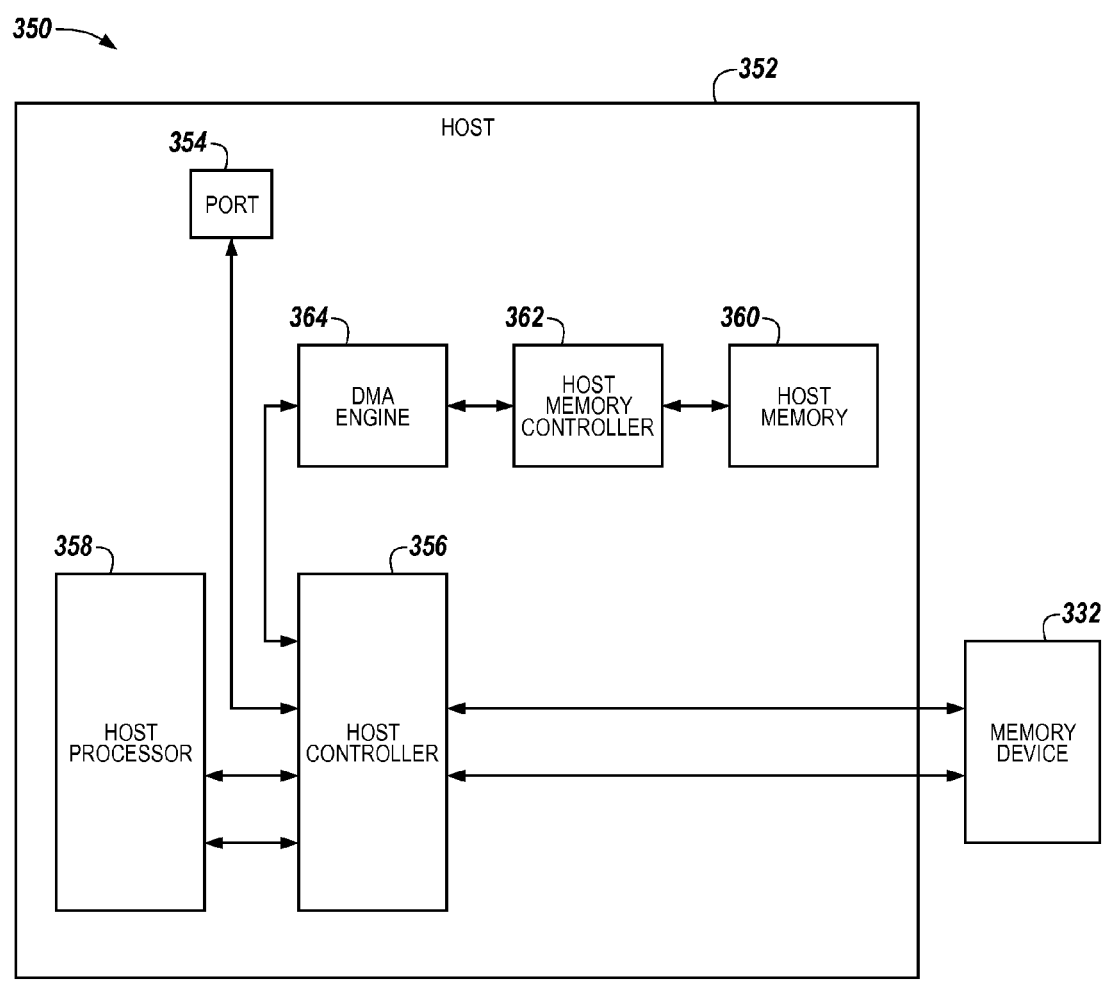
FIG. 3 illustrates a block diagram of a memory system in accordance with one or more embodiments of the present disclosure.

FIG. 3 illustrates a block diagram of a memory system 350 in accordance with one or more embodiments of the present disclosure. As shown in FIG. 3, memory system 350 includes a host 352 and a memory device 332 coupled to host 352. Memory device 332 can be analogous to, for example, memory device 232 previously described in connection with FIG. 2. Although one memory device is shown coupled to host 352 in FIG. 3, embodiments of the present disclosure are not so limited, e.g., memory system 350 can include more than one memory device coupled to host 352 in, for example, a hub-and-spoke or chained configuration.

As shown in FIG. 3, host 352 includes a port 354, a host controller 356, a host processor 358, a host memory 360, a host memory controller 362, and a direct memory access (DMA) engine 364. One of skill in the art will appreciate that host processor 358 can include a number of processors, such as a parallel processing system, a number of coprocessors, etc. Host 352 can also include additional elements, e.g., additional computing device elements, not shown in FIG. 3, as will be understood by one of skill in the art.

Host 352 can be a computing device, such as a personal computer, among other computing device types. Examples of host 352 include laptop computers, personal computers, mobile phones, digital cameras, digital recording and playback devices, PDA's, memory card readers, and interface hubs, among other examples. Host 352 can include a single monolithic chip, multiple chips in a single package and/or module, and/or a combination of packages and/or modules on a printed circuit board.

As shown in FIG. 3, host controller 356 is coupled to port 354 and host processor 358. Host controller 356 is also coupled to host memory 360 via DMA engine 364 and host memory controller 362. Although host memory 360 is shown as being located within host 352, embodiments of the present disclosure are not so limited. For example, host memory 360 can be separate from, e.g., located outside of, host 352, and/or can be located within memory device 332. In both of the examples above, host memory 360 can be considered "associated with" host 352.

Port 354 can be a hardware port. A hardware port can be used to couple a hardware device to host 352. For example, a hardware port can be used to couple a peripheral device, such as a digital camera, an MP3 player, a network device, and/or USB device, among other devices, to host 352. A hardware port can also be used to couple a media codec to host 352 for play-back of audio and/or video. The coupling of a hardware device to host 352 via port 354 can allow the hardware device to communicate with memory device 332, host memory 360, and/or other memory in host 352. Communication can include, for example, reading, writing, and/or erasing data to and/or from the hardware devices, memory device 332, and/or the memory on or coupled to host 352.

Host controller 356 can be used to communicate information between host 352 and memory device 332, e.g., to communicate information from host 352 to memory device 332 and to communicate information from memory device 332 to host 352. For example, host controller 356 can be coupled to implement a standardized interface (not shown) for passing control, address, data, instructions, commands, and other signals between host 352, e.g., host processor 358, and memory device 332. Additionally, when memory device 332 is used for data storage for memory system 350, host controller 356 can implement a serial advanced technology attachment (SATA), a peripheral component interconnect express (PCIe), a universal serial bus (USB), a small computer system interface (SCSI), and/or a universal flash storage (UFS), among other interfaces.

Memory device 332 can include a boot partition that includes boot code for memory system 350, and a number of additional, e.g., non-boot, partitions, as previously described herein. The additional partitions can have sequential and/or a range of logical unit identifiers, e.g., logical unit numbers (LUNs), associated therewith, and the boot partition can have a logical unit identifier, e.g., a logical unit number (LUN), associated therewith that is not in sequence with and/or is outside the range of the logical unit identifiers, e.g., LUNs, associated with the additional partitions, as previously described herein.

Host 352 can be configured to select the boot partition that includes boot code for memory system 350. Memory device 332, e.g., control circuitry in memory device 332, can be configured to associate the LUN with, e.g., assign the LUN to, the boot partition responsive to the selection of the boot partition by host 352.

Host 352 can be aware of the LUN associated with the boot partition. For example, the LUN associated with the boot partition can be stored in host memory 360, and/or the LUN associated with the boot partition can be known to host processor 358. Additionally, the LUN associated with the boot partition can be a default LUN that has been pre-assigned to the boot partition, as previously described herein. However, the boot partition, e.g., the boot code associated with the boot partition, may not be visible to a user of host 352, as previously described herein.

Host 352 can use the boot code to boot memory system 350, e.g., host 352 and/or memory device 332, responsive to an event of memory system 350. For example, responsive to an event of memory system 350, host processor 358 can use the LUN associated with the boot partition to access, e.g., load, the boot code, e.g., data representing the boot code, from memory device 332 through host controller 356. As used herein, "an event" of a memory system can include a booting event of the memory system, such as a power-on and/or a reset of the memory system, among other examples.

For example, responsive to an event of memory system 350, host processor 358 can execute an instruction, e.g., a specific data sequence and/or reference clock, to send a boot command, e.g., a boot code read command, to memory device 332 through host controller 356. The boot command can be addressed to the LUN associated with the boot partition, e.g., the boot command can include the LUN associated with the boot partition. The boot command can also include a header that identifies the command as a boot command. Responsive to receiving the boot command, memory device 332 can send the boot code, e.g., data representing the boot code, to host 352. The data can include a header that identifies the data as boot code data. Responsive to receiving the boot code, host processor 358 can execute the boot code to boot memory system 350.

CONCLUSION

The present disclosure includes boot partitions in memory devices and systems, and methods associated therewith. One or more embodiments include an array of memory cells, wherein the array includes a boot partition and a number of additional partitions. Sequential logical unit identifiers are associated with the additional partitions, and a logical unit identifier that is not in sequence with the sequential logical unit identifiers is associated with the boot partition.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A memory device, comprising:
an array of memory cells, wherein:
  the array includes a boot partition and a number of additional partitions;
  sequential logical unit identifiers are associated with the additional partitions, wherein the sequential logical unit identifiers include all integers from 0 to N−1, inclusive, wherein N is equal to the number of additional partitions; and a logical unit identifier that is not in sequence with the sequential logical unit identifiers and is an integer larger than N is associated with the boot partition.

2. The memory device of claim 1, wherein the boot partition includes boot code executable by a host.

3. The memory device of claim 2, wherein the memory device is configured to send the boot code to the host responsive to receiving a command from the host addressed to the logical unit identifier associated with the boot partition.

4. The memory device of claim 1, wherein the boot partition is a logical unit.

5. The memory device of claim 1, wherein the boot partition is a subdivision of a logical unit.

6. The memory device of claim 1, wherein the boot partition includes a number of logical units.

7. The memory device of claim 1, wherein:
sequential logical unit numbers are associated with the additional partitions; and
a logical unit number that is not in sequence with the sequential logical unit numbers is associated with the boot partition.

8. A memory device, comprising:
an array of memory cells, wherein the array includes a number of boot partitions and a number of additional partitions; and
control circuitry coupled to the array, wherein the control circuitry is configured to:
associate logical unit identifiers with the additional partitions, wherein the logical unit identifiers are within a range of logical unit identifiers, wherein the range of logical unit identifiers includes all integers from 0 to N−1, inclusive, wherein N is equal to the number of additional partitions; and
associate a logical unit identifier with one of the boot partitions, wherein the logical unit identifier is outside the range of logical unit identifiers associated with the additional partitions and is an integer larger than N.

9. The memory device of claim 8, wherein the control circuitry is configured to:
assign a unique logical unit identifier to each of the additional partitions, wherein the assigned logical unit identifiers are within the range of logical unit identifiers; and
assign the logical unit identifier to one of the boot partitions, wherein the assigned logical unit identifier is outside the range of logical unit identifiers assigned to the additional partitions.

10. The memory device of claim 8, wherein the memory device is a flash memory device.

11. The memory device of claim 8, wherein the number of boot partitions are physical partitions.

12. The memory device of claim 8, wherein the control circuitry is configured to:
associate logical unit numbers with the additional partitions, wherein the logical unit numbers are within a range of logical unit numbers; and
associate a logical unit number with one of the boot partitions, wherein the logical unit number is outside the range of logical unit numbers associated with the additional partitions.

13. The memory device of claim 8, wherein:
the array includes more than one boot partition; and
the boot partitions include different boot code executable by a host.

14. The memory device of claim 8, wherein:
the array includes more than one boot partition; and
the boot partitions include identical boot code executable by a host.

15. A method for operating a memory device, comprising:
associating sequential logical unit identifiers with a number of partitions in the memory device, wherein the sequential logical unit identifiers include all integers from 0 to N−1, inclusive, wherein N is equal to the number of partitions; and
associating a logical unit identifier with a boot partition in the memory device, wherein the logical unit identifier associated with the boot partition is not in sequence with the sequential logical unit identifiers associated with the number of partitions and is an integer larger than N.

16. The method of claim 15, wherein:
associating sequential logical unit identifiers with the number of partitions includes assigning, in a configuration descriptor list associated with the memory device, the sequential logical unit identifiers to the number of partitions; and
associating the logical unit identifier with the boot partition includes assigning, in the configuration descriptor list, the logical unit identifier to the boot partition.

17. The method of claim 15, wherein the method includes booting a host device using the boot partition and the logical unit identifier associated with the boot partition.

18. The method of claim 15, wherein the method includes performing programming, sensing, and erase operations on the memory device using the number of partitions and the sequential logical unit identifiers associated with the number of partitions.

19. A method for operating a memory device, comprising:
associating logical unit identifiers with a number of partitions in the memory device, wherein the logical unit identifiers are within a range of logical unit identifiers, wherein the range of logical unit identifiers includes all integers from 0 to N−1, inclusive, wherein N is equal to the number of partitions; and
associating a unique logical unit identifier with a boot partition in the memory device, wherein the unique logical unit identifier associated with the boot partition is outside the range of logical unit identifiers associated with the number of partitions and is an integer larger than N.

20. The method of claim 19, wherein the method includes receiving a command addressed to the unique logical unit identifier associated with the boot partition.

21. The method of claim 19, wherein the method includes sending boot code to a host responsive to receiving the command.

22. The method of claim 19, wherein the method includes pre-assigning the unique logical unit identifier as a default logical unit identifier to be associated with the boot partition.

23. A system, comprising:
a memory device having an array of memory cells, wherein:
the array includes a number of boot partitions and a number of additional partitions;
sequential logical unit identifiers are associated with the additional partitions, wherein the sequential logical unit identifiers include all integers from 0 to N−1, inclusive, wherein N is equal to the number of additional partitions; and
a logical unit identifier that is not in sequence with the sequential logical unit identifiers and is an integer larger than N is associated with one of the boot partitions; and
a host coupled to the memory device, wherein the host is aware of the logical unit identifier associated with the one of the boot partitions.

24. The system of claim 23, wherein:
the host includes a memory; and
the memory includes the logical unit identifier associated with the one of the boot partitions.

25. The system of claim 23, wherein the host is configured to use the logical unit identifier associated with the one of the boot partitions to access the one of the boot partitions during a booting operation.

26. The system of claim 23, wherein the logical unit identifier associated with the one of the boot partitions is a unique logical unit identifier.

27. The system of claim 23, wherein the one of the boot partitions is not visible to a user of the host.

28. The system of claim 23, wherein the logical unit identifier associated with the one of the boot partitions is a default logical unit identifier pre-assigned to the one of the boot partitions.

29. The system of claim 23, wherein the one of the boot partitions includes boot code for the system.

30. The system of claim 29, wherein:
the host is configured to select the one of the boot partitions; and
the memory device is configured to associate the logical unit identifier that is not in sequence with the sequential logical unit identifiers with the one of the boot partitions responsive to the selection of the one of the boot partitions.

31. A system, comprising:
a memory device having an array of memory cells, wherein:
the array includes a boot partition and a number of additional partitions;
logical unit identifiers are associated with the additional partitions, wherein the logical unit identifiers are within a range of logical unit identifiers, wherein the range of logical unit identifiers includes all integers from 0 to N−1, inclusive, wherein N is equal to the number of additional partitions; and
a logical unit identifier is associated with the boot partition, wherein the logical unit identifier is outside the range of logical unit identifiers associated with the additional partitions and is an integer larger than N; and
a host coupled to the memory device, wherein the host is aware of the logical unit identifier associated with the boot partition.

32. The system of claim 31, wherein:
the host is configured to send a command to the memory device addressed to the logical unit identifier associated with the boot partition responsive to an event of the system; and
the memory device is configured to send the boot code to the host responsive to receiving the command.

33. The system of claim 32, wherein the event is a power-on of the system.

34. The system of claim 32, wherein the event is a reset of the system.

35. The system of claim 32, wherein the command is a boot command.

* * * * *